May 16, 1961 J. R. STEPHENSON Re. 24,986

CARD SHUFFLER AND DEALER

Original Filed Oct. 3, 1955 2 Sheets-Sheet 1

INVENTOR.
JAMES R. STEPHENSON.

BY Dybig & Jacox

HIS ATTORNEYS

CARD SHUFFLER AND DEALER
Original Filed Oct. 3, 1955 2 Sheets-Sheet 2
FIG. 3
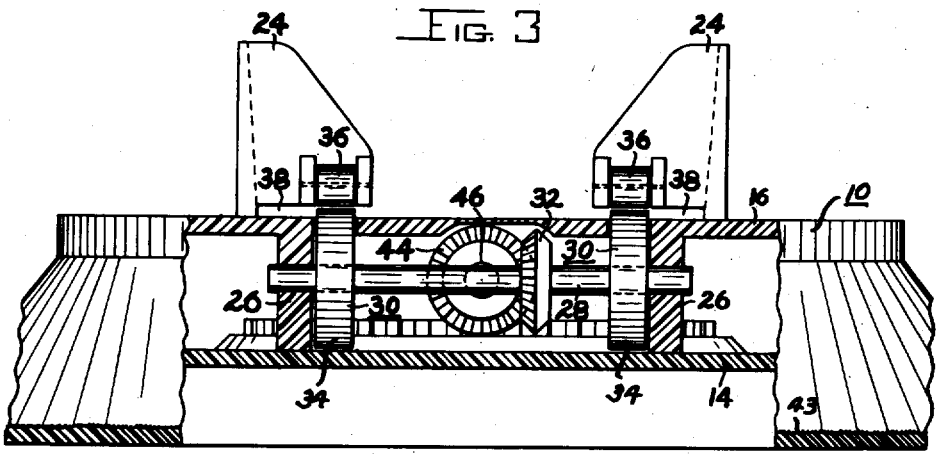
FIG. 4
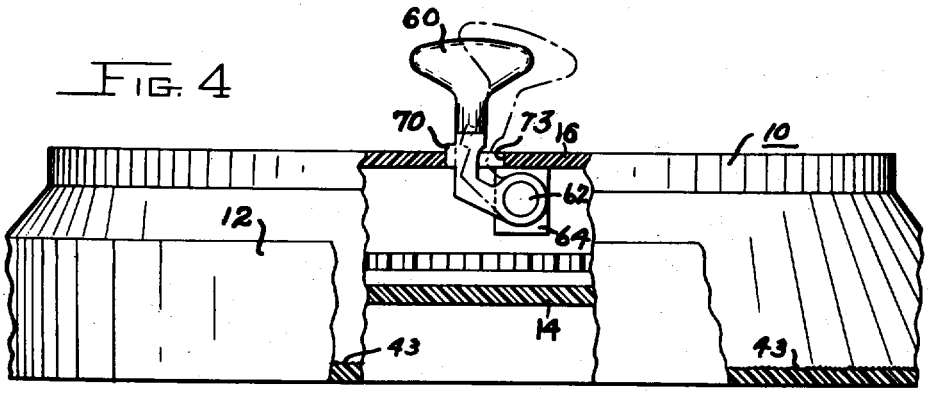
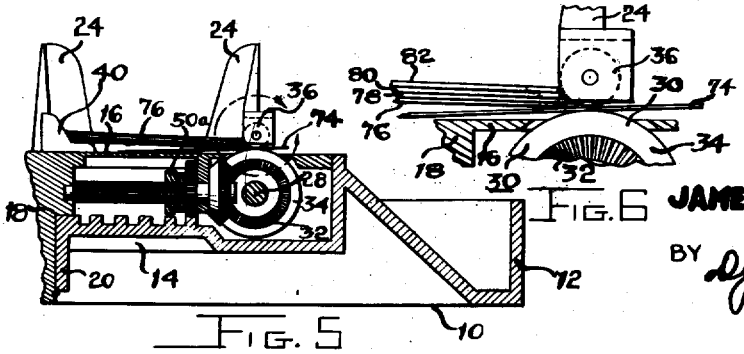
FIG. 5
FIG. 6
INVENTOR
JAMES R. STEPHENSON
BY Dybing & Jacox
HIS ATTORNEYS United States Patent Office Re. 24,986
Reissued May 16, 1961

24,986

CARD SHUFFLER AND DEALER

James R. Stephenson, Dayton, Ohio

Original No. 2,778,644, dated Jan. 22, 1957, Ser. No. 537,994, Oct. 3, 1955. Application for reissue Jan. 29, 1958, Ser. No. 712,053

24 Claims. (Cl. 273—149)

Matter enclosed in heavy brackets [ ] appears in the original patent but forms no part of this reissue specification; matter printed in italics indicates the additions made by reissue.

This invention relates to a card shuffler and dealer.

This application is a continuation in part of my application, Serial No. 240,679, filed August 7, 1951, for Card Shuffler and Dealer, now abandoned.

It is recognized that a large number of different types of card shufflers and/or dealers have been devised from time to time, but these have been either impractical or erratic in operation, too expensive, or have been otherwise objectionable. It is an object of this invention to provide a practical card shuffler which may be manufactured and sold at a low cost.

Another important object of this invention is to provide a card shuffler in which the main parts may be made of molded plastic material.

A further object of this invention is to provide a card shuffler which may be set to deal either two, three, four, five or six hands.

Still another object of this invention is to provide a card shuffler and dealer of the type which may be left on the playing table and used as a tray for the extra cards when playing Canasta and other games.

A further object of this invention is to provide an improved means for sequentially and individually removing cards from the deck.

Other objects and advantages reside in the construction of parts, the combination thereof and the mode of operation, as will become more apparent from the following description.

In the drawings:

Figure 3 is a fragmentary sectional view taken substantially on line 3—3 of Figure 1.

Figure 4 is an end elevational view, with parts broken away, showing the construction of the gear shifting lever.

Figure 5 is a fragmentary view of a portion of the device as shown in Figure 2, with several playing cards in the dealing pocket.

Figure 6 is an enlarged fragmentary view taken substantially within the arcuate line [6] in Figure 5.

Figure 1:
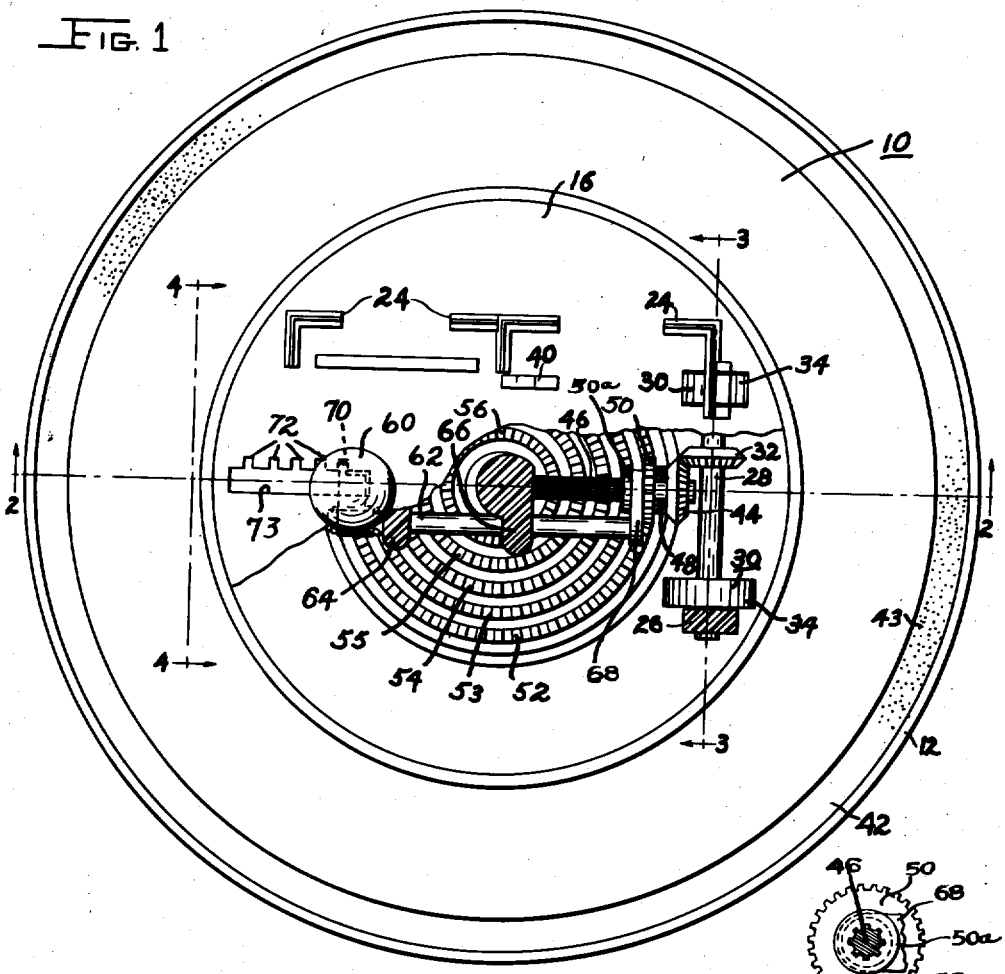
Figure 1 is a plan view, with parts broken away, showing a card shuffler constructed in accordance with my invention.
Figure 7:
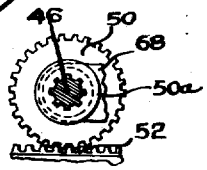
Figure 7 is a fragmentary, cross-sectional view taken substantially on the line 7—7 of Figure 2.

Referring now to the drawings wherein I have shown a preferred embodiment of my invention reference numeral 10 generally designates a one-piece molded support or main frame, which for purposes of illustration has been shown circular in shape, whereas other shapes could be used, if desired. This main frame is provided with an integrally formed upstanding card stopping flange 12 and a centrally disposed circular cavity or gear housing 14.

Figure 2:
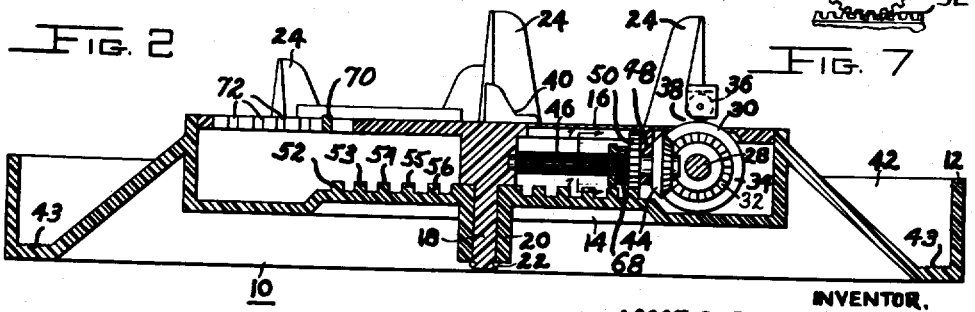
Figure 2 is a vertical sectional view taken substantially on line 2—2 of Figure 1.

A rotatable platform 16 is pivotally supported on the main frame *10* [12], as shown. This platform is provided with an integrally formed post or axle 18 which is journaled within the hub portion 20 formed as an integral part of the main frame or support 10, as best shown in Figure 2. A spring clip 22 holds the central post 18 in assembled relationship on the support 10. The top surface of the platform 16 is provided with a plurality of card or deck positioning projections 24 which are so arranged as to form two card pockets arranged side by side for receiving and locating two piles of cards from a deck. This arrangement is convenient when playing certain card games as, for example, "Canasta."

As best shown in Figure 3, the bottom surface of the platform 16 is provided with a first pair of integrally formed bearing supports 26 in which a shaft 28 is journaled. A pair of friction wheels 30 and a pinion 32 are keyed to the shaft 28. The friction wheels or rollers 30 project through slots provided in the platform 16 at a point on the platform, so as to engage the lowermost card on the pile of cards located thereabove. Each of the friction wheels is preferably provided with a flat rubbertire-like portion 34 for engaging the cards during the card dispensing operation. Above each friction wheel there is provided a small *duo-functional* roller 36 for holding the cards against the friction wheel 30. The rollers 36 preferably have smooth surfaces having the character of polished metal. As best indicated in Figure 3 of the drawings, the two card positioning projections 24, located above the friction wheels 30, are cut away as indicated at 38, so as to in effect form a card feeding slot adjacent the friction wheels 30. As shown in Figure 2, the one edge of the deck, which is opposite the friction wheels 30, is held in a slightly elevated position by means of one or more cam-like elements 40 formed integrally with the platform 16. These cams are so shaped and arranged that they serve to shove the lowermost card of the deck in between the friction wheels 30 and the rollers 36, so that as the wheels 30 are rotated, the lowermost card will be fed between the rollers and will be dispensed from the platform into the circumferentially extending card receiving channel 42 in a manner to be explained more fully hereinafter. The entire bottom wall of the card receiving channel is roughened as shown at 43, so as to prevent the cards dealt therein from sliding to the outer edge of the channel. As clearly disclosed in Figure 2, the bottom includes a frustum-conical portion sloping outwardly and downwardly, providing an inclined ledge surrounded by the flange 12. The cards are dealt upon the ledge and retained by the flange 12. The mechanism for imparting rotation to the pinion 32 and friction wheels 30 includes a pinion 44 which is secured to a drive shaft 46, as best shown in Figures 1 and 2. This drive shaft is carried by the rotatable platform and has the one end thereof journaled in the bearing portion 18 which is formed integrally with the [gear housing 14] *platform 16*, as clearly shown in Figure 2. The other end of the drive shaft 46 is journaled in a downwardly extending projection 48 formed as an integral part of the rotatable platform 16. The shaft 46 slidably supports a pinion or gear 50 which is splined to the shaft, so that the two rotate in unison at all times. The gear 50 is arranged to selectively mesh with any one of several circular rows of gear teeth integrally formed on the top side of the bottom wall of the gear housing 14, as best shown in Figure 1. For purposes of illustration, I have shown an arrangement in which five rows of these gear teeth 52, 53, 54, 55 and 56 are provided. Upon rotation of the platform 16 and the associated gear 50, the drive shaft 46 will be caused to operate at a speed determined by the particular row or series of gear teeth with which it is arranged to mesh.

*The number of gear teeth 52, 53, 54, 55 and 56 has been so selected that each repetitious movement or rota-*

*tion of the platform 16 will feed out a card in the same position as in the previous and as in the succeeding revolution.*

As pointed out hereinabove, the gear 50 is slidably mounted on the drive shaft 46 whereby it is possible to have the gear 50 engage any one of the series of teeth 52 to 56. When the gear 50 is arranged in meshing engagement with the series of teeth 52, the card feeding rollers 30 will be caused to operate at such a speed that six cards will be dealt per revolution of the platform 16. The construction and arrangement of the parts is such that upon each subsequent revolution of the platform 16 six additional cards will be dealt out and will be dropped onto the previously dealt cards. Thus, if there are six players and each player is to be dealt eleven cards, one would position the gear 50 over the series of gear teeth 52 and would then rotate the platform 16 through eleven revolutions and by so doing would deal six hands of eleven cards each. If there are to be five players, the gear 50 is moved into meshing engagement with the circular row of gear teeth 53, which obviously has less teeth than the row 52, so that five cards will be dealt for each revolution of the platform 16.

A gear shift handle 60 has been provided which serves a dual purpose in that it is also used for imparting rotation to the platform 16 during the process of dealing out the cards. This handle is secured to a rod 62 which is slidably supported in bearing projections 64 and 66 which are formed integrally with the platform 16. The slide rod 62 is provided with a gear shifting segment or yoke 68 seated in an annular channel in the hub 50a integral with the gear 50. The handle connected to the rod 62 and the yoke 68 shifts the gear 50 from engagement with one series of gear teeth to another. As best shown in Figures 1 and 4, the gear shift handle 60 is provided with a locking projection 70 which is adapted to releasably and selectively engage within the slots 72 provided in the one side of the opening 73 provided in the platform 16, so that once the lever or handle 60 is set for dealing out a given number of hands, it will not inadvertently slip out of gear during the process of dealing. The handle 60 is shown in one of the card pockets in Figure 1. However, by moving the handle 60 to the extreme left position shown in Figure 1, the handle 60 is moved out of the card pocket.

By virtue of the above described construction and arrangement, any number of hands from two to six can be dealt out and any number of cards can be dealt to each player. When it is desired to thoroughly mix the cards in the deck, one would set the lever 60 to deal five or six hands and would deal out all of the cards and then return the cards to the pocket before dealing hands to the players. One can repeat this mixing process as many times as desired. In picking up the cards during the mixing process, one would preferably pick up the piles of cards out of order so as to further mix the cards. In dealing out cards for the purpose of mixing the cards, it is preferable to set the gear shift lever so as to deal out either more or less piles than there are players.

Figures 5 and 6 illustrate the operation of the wheel 30 and the roller 36 when cards 74, 76, 78, 80 and 82 are placed in the pocket adjacent the wheel 30. The dimensions of the cards with respect to the pocket are such that when the cards are initially placed in the pocket, the outer margin of the lowermost card 74 rests upon an arcuate portion of the wheel 30. As the wheel 30 rotates, the card 74 is frictionally drawn by the wheel 30 toward the roller 36 where the card is nipped by the wheel 30 and the roller 36 then drawn therebetween.

As most clearly seen in Figure 6, the card 76 which is adjacent the bottom card 74 abuts the roller 36 during the time that the card 74 is being drawn under the roller 36. It has been determined experimentally with conventional playing cards that the card 76 will not be drawn between the wheel 30 and the roller 36 along with the card 74 provided that the diameter of the roller 36 is not more than 16 times the thickness of the playing card. This result applies when the roller 36 has a polished metal surface and the wheel 30 is covered with a rubber tire-like portion 34.

When the full length of the card 74 has been drawn between the wheel 30 and roller 36, the card 76 will drop into contact with the wheel 30 and follow the card 74 between the wheel 30 and the roller 36.

By virtue of the construction shown, very few parts are required and the main parts, such as the main frame 10 and the platform 16, may be made at a very nominal cost, as they can be made of molded plastic. The parts can be quickly assembled, with the result that the labor costs are also low. Furthermore, the principle of operation and the construction of the parts is such that ordinary wear on the gears will not throw the device out of adjustment.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a card dealing device, a stationary support having pocket means formed therein for receiving cards, a platform rotatably mounted on said support, said pocket means having a base a portion of which is in the shape of a conical frustum diverging outwardly and downwardly, means for positioning a deck of cards on said platform, and variable speed ratio means for feeding cards from said deck into a predetermined number of piles in said pocket means.

2. In a card dealing device, a stationary support having pocket means formed thereon for receiving cards, a platform rotatably mounted on said support, said pocket means having a base a portion of which is in the shape of a conical frustum diverging outwardly and downwardly, means for positioning a deck of cards on said platform, and variable speed ratio means for feeding cards from said deck into a predetermined number of piles in said pocket means, said last named means comprising a stationary cam arranged to engage the one edge of the lowermost card on the deck and a card feeding means for frictionally engaging the bottom of said card at a point opposite said cam.

3. In a card dealing device, a stationary support having card receiving pocket means formed thereon, a platform rotatably mounted on said support, said pocket means having a base a portion of which is in the shape of a conical frustum diverging outwardly and downwardly, means for positioning a deck of cards on said platform, and means for feeding cards from said deck into predetermined piles on said stationary support, said last named means comprising a first series of gear teeth carried by said support, a pinion rotatably mounted on said platform for engaging said gear teeth, and means operated by said pinion for delivering cards from said platform onto said support in response to relative rotation between said platform and said support.

4. In a card dealing device, a stationary support having card receiving pocket means formed thereon, a platform rotatably mounted on said support, said pocket means having a base a portion which is in the shape of a conical frustum diverging outwardly and downwardly, means for supporting a deck of cards on said platform, and variable speed ratio means for feeding cards from said deck into predetermined piles on said platform, said last named means comprising a plurality of series of stationary gears carried by said support, a pinion rotatably supported on said platform for selectively engaging the gears of one of said series, and means operated by said pinion for delivering cards from said platform onto said support in response to relative rotation between said platform and said support.

5. In a card dealing device, a stationary support having card receiving pocket means formed thereon, a platform rotatably mounted on said support, said pocket means having a base a portion of which is in the shape of a conical frustum diverging outwardly and downwardly, means for supporting a deck of cards on said platform, and variable speed ratio means for feeding cards from said deck into predetermined piles in the pocket means on said support, said last named means comprising a plurality of series of stationary gears carried by said support, a pinion rotatably supported on said platform for selectively engaging the gears of one of said series, and means operated by said pinion for delivering cards from said platform onto said support in response to relative rotation between said platform and said support, said stationary support comprising a plastic element having said series of stationary gears formed integrally therewith in concentric rows.

6. In a card dealing device, a stationary support having card receiving pocket means formed thereon, a platform mounted on said support to rotate about a given axis, said pocket means having a base a portion of which is in the shape of a conical frustum diverging outwardly and downwardly, means for supporting a deck of cards on said platform, means for feeding cards from said deck into predetermined piles in the pocket means on said support, said last named means comprising a plurality of series of stationary gear teeth carried by said support and disposed in concentric rows about said axis, a pinion rotatably supported on said platform, means operated by said pinion for delivering cards from said platform onto said support in response to relative rotation between said platform and said support, certain of said series of gear teeth having more teeth than other of said series, and means for selectively shifting said pinion into engagement with any one of said series of gear teeth so as to select the frequency at which cards are delivered from said platform onto said support.

7. In a card dealing device, a plastic support having an annular flange and having a plurality of series of gear teeth provided thereon arranged in concentric circles, a platform carried by said support for rotation about the axis of said circles, said platform being mounted for rotation within said annular flange, an outwardly and downwardly directed ledge in the shape of a conical frustum surrounding said flange, means for supporting a deck of cards in a predetermined position on said platform above said gear teeth, card feeding means arranged to frictionally engage the lowermost card of said deck, a first shaft journaled on said platform, said card feeding means being keyed to said first shaft, a first pinion on said first shaft, a second shaft arranged substantially at right angles to said first named shaft, a second pinion carried by said second shaft and arranged in meshing engagement with said first named pinion, and a third pinion splined to said second named shaft so as to be slidable thereon for selective engagement with one of said series of gear teeth, said card feeding means dealing the cards into piles upon said ledge.

8. In a card dealing device, a support having a plurality of circumferentially disposed series of gear teeth provided on one face thereof, said support including an annular channel-shaped portion surrounding the gear teeth, a part of the channel-shaped portion sloping downwardly and outwardly, a platform rotatably carried by said support and having a slot formed therein, means for supporting a deck of cards in a predetermined relationship relative to said platform, friction means arranged to frictionally engage the lowermost card of said deck, a first shaft journaled on said platform, means for transmitting power from said first shaft to said friction means, a first pinion on said first shaft, a second shaft arranged substantially at right angles to said first named shaft, a second pinion carried by said second shaft arranged in meshing engagement with said first named pinion, a third pinion splined to said second named shaft so as to be slidable thereon for selective engagement with one of said series of gear teeth, a slide bar for shifting said third pinion on said second shaft, said slide bar being mounted beneath said platform and having a lever projecting upwardly through said slot formed in said platform, and means for releasably holding said lever in predetermined positions within said slot, said friction means dealing the cards into piles in the channel-shaped portion upon rotation of the platform.

9. In a card dealing device, a plastic support having a plurality of circumferentially disposed series of gear teeth provided thereon, said support being provided with a marginal flange surrounding an outwardly and downwardly sloping card receiving surface, a platform rotatably carried by said support and having a slot formed therein, means for supporting a deck of cards in a predetermined relationship relative to said platform, friction means arranged to frictionally engage the lowermost card of said deck, a first shaft journaled on said platform, said friction means being keyed to said first shaft, a first pinion on said first shaft, a second shaft arranged substantially at right angles to said first named shaft, a second pinion carried by said second shaft arranged in meshing engagement with said first named pinion, a third pinion splined to said second named shaft so as to be slidable thereon for selective engagement with one of said series of gear teeth, gear shifting means including a slide bar for shifting said third pinion on said second named shaft, said slide bar being mounted beneath said platform and having a lever projecting upwardly through said slot in said platform, and a knob on the upper end of said lever for use in actuating said slide bar for gear shifting purposes and for imparting rotation to said platform so that as the platform is rotated the friction means deals the cards into piles deposited upon said card receiving surface.

10. In combination, a one-piece molded plastic support having a plurality of concentric rows of upwardly projecting gear teeth formed integrally therewith, said stationary support including an upwardly directed annular flange surrounding said gear teeth, a second annular flange arranged in spaced relation from the first mentioned flange, an inclined portion between the annular flanges forming a receptacle, an annular platform mounted above the gear teeth and within the first mentioned annular flange, means for supporting said platform for rotation about the central axis of said concentric rows of gear teeth, card feeding means carried by said platform including a rotatably mounted power transmitting gear, and means for selectively shifting said gear into selective engagement with any one of said rows of gear teeth.

11. In a card dealing device, a stationary support having a circumferentially disposed card receiving channel formed thereon, a portion of the card receiving channel being inclined outwardly and downwardly, a platform rotatably mounted on said support, means for supporting a deck of cards in a predetermined position on said platform, said last named means having a slot adjacent the bottom edge thereof through which cards may be ejected from said platform into said channel, variable speed ratio means for feeding cards from said deck into predetermined piles in said channel, and cam means on said platform opposite said slot for camming the lowermost card on said deck into said slot, said means for feeding the cards from said platform comprising friction rollers for frictionally engaging the bottom surface of each card as it enters said slot to feed the cards in piles in the card receiving channel.

12. In a card dealing device, a stationary support having gear teeth formed integrally therewith on one face thereof, said stationary support including an upwardly directed annular flange surrounding said gear teeth, an annular platform mounted above the gear teeth and within the annular flange, means for rotatably mounting said platform on said stationary support, means for positioning a deck of cards on said platform, and means operable in response to relative rotation between said support and said platform for feeding cards from said deck into a predetermined number of piles, said last named means comprising a power transmitting gear rotatably supported on said rotatably mounted platform and arranged in driving engagement with said gear teeth, and an annular channel integral with the stationary support and surrounding the annular flange, a portion of the channel sloping outwardly and downwardly from said annular channel.

13. In a card dealing device, a main supporting member, a platform member rotatably mounted on said main supporting member, one of said members having a cavity closed by the other of said members so as to form a housing, means for supporting a deck of cards on one of said members, means for feeding cards from said deck into predetermined piles, said last named means comprising gear teeth formed on one face of one of said members, a pinion rotatably supported on the other of said members in meshing engagement with said gear teeth, said pinion and said gear teeth being mounted within said housing, means operated by said pinion for delivering cards from said deck onto said piles in response to relative rotation between said supporting member and said platform member, and an annular channel having a portion in the shape of a conical frustum integral with the main supporting member into which the piles are deposited.

14. In a card dealing device, a main supporting member having an annular channel having a base a portion of which is in the shape of a conical frustum diverging outwardly and downwardly, a platform member rotatably mounted on said supporting member, said members cooperating to form a housing, means for supporting a deck of cards on one of said members, and means for feeding cards from said deck into predetermined piles deposited in said channel, said last named means comprising gear teeth integrally formed on the face of one of said members and located within said housing, a pinion rotatably supported on the other of said members for engaging said gear teeth, and means operated by said pinion for delivering cards from said deck onto said piles in response to relative rotation of said members.

15. In a card dealing device, a support surrounded by an annular channel having a portion in the shape of a conical frustum, a platform, means for mounting said platform for rotation relative to said support, means for positioning a deck of cards on said platform, and variable speed ratio means for feeding cards from said deck into predetermined piles deposited in said channel, said last named means comprising a plurality of gear teeth carried by said support, a pinion rotatably supported on said platform, and means operated by said pinion for frictionally engaging the lowermost card on said deck and for feeding said card onto one of said piles in response to relative rotation between said platform and said support.

16. In a card dealing device, a stationary support having a hollow cavity surrounded by a card receiving annular channel having a portion in the shape of a conical frustum, a platform rotatably mounted within the hollow cavity in said support, said platform forming a cover for the hollow cavity, means for supporting a deck of cards in a predetermined position on said platform, said last named means having a slot adjacent a bottom edge thereof through which cards may be ejected into piles deposited in said channel, cam means on said platform opposite said slot for camming the lowermost card of said deck into said slot, and card dealing means for frictionally engaging the bottom surface of cards as they enter said slot.

17. In combination, a support surrounded by a pair of concentric annular flanges joined by a portion in the shape of a conical frustum, a platform rotatably mounted on the axis of said support, card feeding means carried by said platform for depositing the cards in piles located between said flanges, said card feeding means including a drive element arranged to ride on the top surface of said support and to be driven thereby in response to relative rotation between said support and said platform, and means for adjusting the distance between said axis and said drive element so as to vary the rate at which cards are fed by said card feeding means, said means comprising a slide rod carried by said platform adapted to engage said drive element for movement in a radial direction on the support, and retaining means on said platform for releasably securing said slide rod in predetermined positions.

18. In a card dealing device, a stationary support having card receiving pocket means formed thereon, a platform mounted on said support to rotate about a given axis, means for supporting a deck of cards on said platform, means for feeding cards from said deck into predetermined piles in the pocket means in said support, said last mentioned means including a pair of rollers located to one side of the deck of cards, the rollers being located one above the other, the lower roller of the pair having a comparatively large diameter a portion of which projects above the lower level of the deck of cards and projects under the margin of the lowermost card, the upper roller being much smaller than the lower roller so that the upper roller, cooperating with the lower roller, engages the margin of the lowermost card, the upper roller being sufficiently small that the next to the lowest card, which card is engaged by the upper roller, is held thereby against withdrawal until the lowermost card has been fed out by the rollers.

*19. In a card dealing device, a support member having card receiving pocket means thereon, a platform member, means for rotating one of said members relative to the other member, means for supporting a deck of cards on said platform member, means for feeding cards from said deck into predetermined piles in the pocket means on said support member, said means for feeding cards including a pair of rollers located to one side of the deck of cards, the rollers being located one above the other, the lower and driving roller of the pair having a comparatively large diameter, a portion of which projects under the lower level of the deck of cards and another portion of which projects beyond the margin of the deck of cards, the upper duo-functional roller being much smaller than the lower roller so that the upper roller cooperating with the lower roller engages the margin of the lowermost card and is driven thereby, the upper roller being sufficiently small that the next to the lower card, which card abuts and is engaged by the upper roller, is held thereby against withdrawal until the lowermost card has been fed out of the rollers.*

*20. In a card dealing device, the combination including means for supporting a deck of cards, means for feeding cards from the said deck of cards, said last mentioned means including a pair of rollers located to one side of the deck of cards, the rollers being located one above the other, the lower roller of the pair having a comparatively large diameter, a portion of which projects under the deck of cards and another portion projects beyond the margin of the deck of cards, the upper duo-functional roller being much smaller than the lower roller so that the upper roller cooperating with the lower roller engages the margin of the lowermost card, the upper roller being sufficiently small that the next to the lowermost card, which next card abuts and is engaged by the upper roller, is held against withdrawal until the lowermost card has been fed out of the rollers.*

*21. In a card dealing device, a support member, a platform member, means for repetitiously moving one of said members relative to the other member, means for supporting a deck of cards upon the platform member, means for feeding cards from said deck of cards into predetermined piles, said last mentioned means including a pair of rollers located to one side of the deck of cards, the rollers being located one above the other, the lower roller of the pair having a comparatively large diameter, a portion of which projects under the lower level of the deck of cards and another portion of which projects beyond the margin of the deck of cards, the upper duo-functional roller being much smaller than the lower roller so that the upper roller cooperating with the lower roller engages the margin of the lowermost card, the upper roller being sufficiently small that the next to the lowermost card, which next card abut and is engaged by the upper roller, is held against withdrawal until the lowermost card has been fed out of the rollers.*

*22. In a card dealing device, a support member having card receiving pocket means thereon, a platform member, means for repetitiously moving one of said members relative to the other member, means for supporting a deck of cards on said platform member, means for feeding cards from said deck of cards into predetermined piles in the pocket means on said support member, said means for feeding cards including a pair of rollers located to one side of the deck of cards, the rollers being located one above the other, the lower roller of the pair having a comparatively large diameter, a portion of which projects under the lower level of the deck of cards and projects beyond the margin of the deck of cards, the upper duo-functional roller being much smaller than the lower roller so that the upper roller cooperating with the lower roller engages the margin of the lowermost card, the upper roller being sufficiently small that the next to the lowermost card, which next card abuts and is engaged by the upper roller, is held thereby against withdrawal until the lowermost card has been fed out of the rollers, and means for driving the lower roller from the means for moving said first mentioned members relative to each other so that the rollers are driven in synchronism with said first mentioned driving means.*

*23. In a card dealing device, the combination including means for supporting a deck of cards, means for feeding the cards from said deck of cards, said last mentioned means including a pair of rollers located to one side of the deck of cards, the rollers being located one above the other, the lower roller of the pair having a comparatively large diameter and having a rubber tire-like peripheral portion, only a portion of which projects beyond the margin of the deck of cards, the upper duo-functional roller being much smaller than the lower roller, so that the upper roller cooperating with the lower roller engages the margin of the lowermost card, the upper roller being sufficiently small that the next to the lowermost card, which card abuts and is engaged by the upper roller, is held against withdrawal until the lowermost card has been fed out of the rollers, said means for supporting the cards including a cam-like element engaging the margin of the deck of cards opposite the rollers and holding the deck of cards at an incline so that the lowermost card slants downwardly towards the rollers.*

*24. In a card dealing device, the combination including means for supporting a deck of cards, said means including a cam element underlying one margin of the deck of cards so as to hold this margin at a higher level than the opposite margin of the deck of cards, means for feeding the cards from said deck of cards, said last mentioned means including a pair of rollers located to the side of the deck of cards opposite the cam element, the rollers being located one above the other, the lower roller of the pair having a comparatively large diameter, a portion of which projects under the deck of cards and another portion projects beyond the deck of cards, the upper duo-functional roller being much smaller than the lower roller so that the upper roller cooperating with the lower roller engages the margin of the lowermost card, the upper roller being sufficiently small that the next to the lowermost card, which next card abuts and is engaged by the upper roller, is held against withdrawal thereby until the lowermost card has been fed out of the rollers.*

References Cited in the file of this patent or the original patent

UNITED STATES PATENTS

| | | |
|---|---|---|
| 555,886 | Rich | Mar. 3, 1896 |
| 749,986 | Dick | Jan. 19, 1904 |
| 999,670 | Murch | Aug. 1, 1911 |
| 1,003,087 | Brady | Sept. 12, 1911 |
| 1,316,427 | Cook | Sept. 16, 1919 |
| 1,969,117 | Bohling | Aug. 7, 1934 |
| 2,065,824 | Plass | Dec. 29, 1936 |
| 2,214,752 | Pierce | Sept. 17, 1940 |
| 2,257,843 | Payne | Oct. 7, 1941 |

FOREIGN PATENTS

| | | |
|---|---|---|
| 354,914 | Great Britain | Aug. 20, 1931 |
| 107,019 | Sweden | Mar. 30, 1943 |